(12) United States Patent
Modai et al.

(10) Patent No.: US 10,733,213 B2
(45) Date of Patent: Aug. 4, 2020

(54) STRUCTURING UNSTRUCTURED MACHINE-GENERATED CONTENT

(71) Applicant: Iguazio Systems Ltd., Herzliya (IL)

(72) Inventors: Ori Modai, Ramat Hasharon (IL); Orit Nissan-Messing, Hod Hasharon (IL); Yaron Haviv, Tel Mond (IL)

(73) Assignee: Iguazio Systems Ltd., Herzliya (IL)

( * ) Notice: Subject to any disclaimer, the term of this patent is extended or adjusted under 35 U.S.C. 154(b) by 0 days.

(21) Appl. No.: 16/237,673

(22) Filed: Dec. 31, 2018

(65) Prior Publication Data

US 2020/0210456 A1  Jul. 2, 2020

(51) Int. Cl.
| | |
|---|---|
| *G06F 16/00* | (2019.01) |
| *G06F 16/28* | (2019.01) |
| *G06F 16/248* | (2019.01) |
| *G06F 16/2455* | (2019.01) |
| *G06F 16/2452* | (2019.01) |

(52) U.S. Cl.
CPC .......... *G06F 16/285* (2019.01); *G06F 16/248* (2019.01); *G06F 16/2455* (2019.01); *G06F 16/24522* (2019.01)

(58) Field of Classification Search
CPC ............... G06F 16/285; G06F 16/2455; G06F 16/24522; G06F 16/248
USPC ......................................................... 707/737
See application file for complete search history.

(56) References Cited

U.S. PATENT DOCUMENTS

| | | | | |
|---|---|---|---|---|
| 8,577,829 | B2* | 11/2013 | Subrahmanyam | G06N 7/005 706/52 |
| 8,620,928 | B1* | 12/2013 | Walton | G06F 40/16 707/748 |
| 9,122,694 | B1* | 9/2015 | Dukes | G06F 16/1748 |
| 9,626,414 | B2* | 4/2017 | Kanjirathinkal | G06F 16/24578 |
| 2005/0172162 | A1* | 8/2005 | Takahashi | G06F 11/079 714/4.4 |
| 2006/0184529 | A1* | 8/2006 | Berg | G06F 11/0709 |
| 2006/0195297 | A1* | 8/2006 | Kubota | G06F 16/95 702/187 |
| 2008/0195583 | A1* | 8/2008 | Hsu | G06F 16/2455 |
| 2010/0011031 | A1* | 1/2010 | Huang | G06F 21/552 707/E17.007 |
| 2010/0082755 | A1* | 4/2010 | Bryan | H04L 51/04 709/206 |
| 2011/0066585 | A1* | 3/2011 | Subrahmanyam | G06N 7/005 706/52 |

(Continued)

*Primary Examiner* — Thanh-Ha Dang
(74) *Attorney, Agent, or Firm* — FisherBroyles, LLP; Ariel Reinitz

(57) ABSTRACT

Systems and methods are disclosed for structuring unstructured machine-generated content. In one implementation, unstructured content is received and processed to identify a first content segment. Parameter(s) within the first content segment are identified and classified. A content segment skeleton that reflects an arrangement of the first content segment is generated. Based on the classifying of the parameter(s), the parameter(s) are extracted s from the first content segment into a structured content element in a structured content format, with the structured content element including a representation of the content segment skeleton. Based on the structured format, a query adapter is generated. Queries are executed via the query adapter and the structured format.

19 Claims, 5 Drawing Sheets

(56) References Cited

U.S. PATENT DOCUMENTS

| | | | |
|---|---|---|---|
| 2011/0173153 A1* | 7/2011 | Domashchenko | G06F 16/86 |
| | | | 707/608 |
| 2014/0067761 A1* | 3/2014 | Chakrabarti | G06F 16/2336 |
| | | | 707/634 |
| 2014/0298034 A1* | 10/2014 | Watanabe | H04L 9/3236 |
| | | | 713/176 |
| 2015/0220605 A1* | 8/2015 | Syed | G06F 17/40 |
| | | | 707/776 |
| 2016/0134672 A1* | 5/2016 | Lotfallah | H04L 65/60 |
| | | | 709/231 |
| 2016/0196360 A1* | 7/2016 | Best | G06F 16/367 |
| | | | 707/722 |
| 2016/0371238 A1* | 12/2016 | Heavenrich | G06F 40/151 |
| 2017/0060945 A1* | 3/2017 | Bastide | G06F 16/24542 |
| 2017/0075904 A1* | 3/2017 | Hedges | G06F 16/367 |
| 2018/0107402 A1* | 4/2018 | Pogosyan | G06F 3/0673 |

* cited by examiner

STRUCTURING UNSTRUCTURED MACHINE-GENERATED CONTENT

TECHNICAL FIELD

Aspects and implementations of the present disclosure relate to data processing and, more specifically, but without limitation, to structuring unstructured machine-generated content.

BACKGROUND

Existing technologies generate large volumes of unstructured content. Such unstructured content can include logs, streams, and feeds.

SUMMARY

The following presents a shortened summary of various aspects of this disclosure in order to provide a basic understanding of such aspects. This summary is not an extensive overview of all contemplated aspects and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for structuring unstructured machine-generated content. In one implementation, unstructured content is received and processed to identify a first content segment. Parameter(s) within the first content segment are identified and classified. A content segment skeleton that reflects an arrangement of the first content segment is generated. Based on the classifying of the parameter(s), the parameter(s) are extracted s from the first content segment into a structured content element in a structured content format, with the structured content element including a representation of the content segment skeleton. Based on the structured format, a query adapter is generated. Queries are executed via the query adapter and the structured format.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
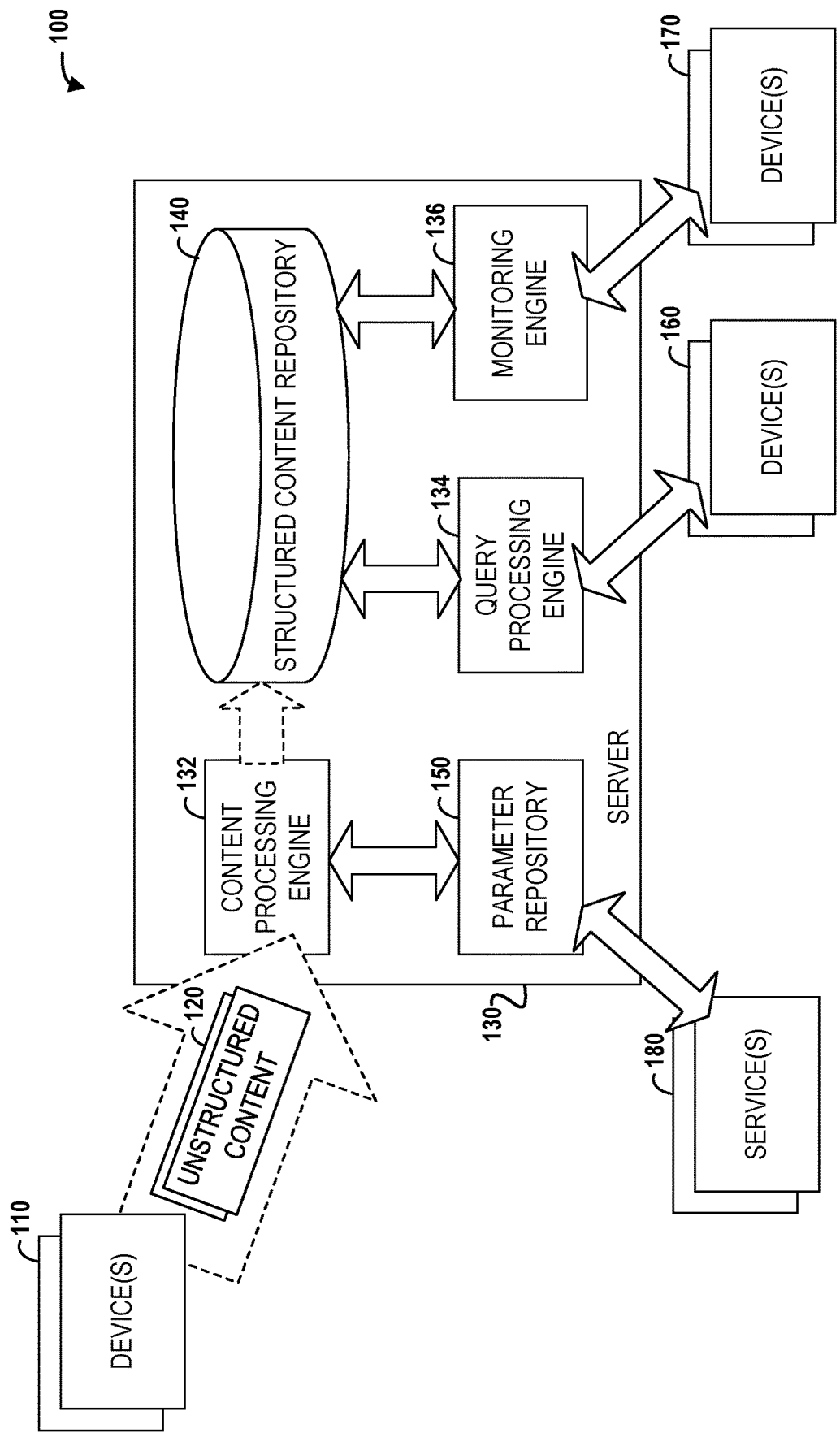
FIG. 1 illustrates an example system, in accordance with an example embodiment.

Aspects and implementations of the present disclosure are directed to structuring unstructured machine-generated content.

Existing technologies (e.g., devices, sensors, systems, services, etc.) generate large volumes of unstructured content. Such unstructured content can include logs, streams, feeds, etc. While such logs, streams, etc., may contain valuable and/or actionable data, the unstructured nature of such content precludes many operations.

While attempts have been made to improve the handling of such unstructured content, many inefficiencies remain. For example, certain approaches (e.g., "Elasticsearch") have attempted to index every parameter present in a log file. However, such approaches result in considerable processing inefficiencies, e.g., with respect to generating such indexes and/or querying such content. By way of further example, various pattern-based approaches can require manual intervention, e.g., by an administrator who configures the data patterns to be used. In addition to inefficiencies associated with manual configuration, such approaches are also content-dependent and not readily adaptable, particularly in view of increasing volumes of data emerging from modern application usage, Internet of Things (Tor), social networks/platforms, cloud services, etc.

Accordingly, described herein are technologies that enable the processing of such unstructured content (e.g., logs, feeds, streams, etc.) in order to identify and impose a structure on it. In certain implementations, the described technologies process the unstructured content to identify various elements within such content, generate structure(s) that correspond to such content, and/or extract such identified elements into the generated structure. In doing so, information from the unstructured logs, etc. (e.g., log patterns, parameters, etc.—reflecting which parameters are labels, metrics, keys, etc.), can be extracted into a structured format such as a database. Such extracted content can be indexed in a database (e.g., using a key value store or time series database, as described herein). In doing so, various query tools that provide access and/or retrieve content from the structured database can be enabled. Accordingly, the described processing, extracting, indexing, etc., operations can provide significant benefits and technical improvements beyond those available with prior approaches. For example, by creating a structure for previously unstructured data and extracting and indexing unstructured data into such a structure, the described technologies dramatically increase efficiencies with respect to processing large volumes of unstructured content and/or indexing, accessing, and/or retrieving content originally contained within such unstructured content. Doing so can improve the functionality of various machines, servers, databases, services, etc., such as those described herein. For example, by processing unstructured content (e.g., logs) in the manner described herein, database(s) can be generated and maintained in near real-time which can enable queries (e.g., structured queries, free text queries, etc.) to be efficiently performed on information included within such logs (efficiencies and/or results not provided by existing technologies).

It can therefore be appreciated that the described technologies are directed to and address specific technical challenges and longstanding deficiencies in multiple technical areas, including but not limited to content handling, data processing, and databases. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

By way of illustration, FIG. 1 depicts an example system 100, in accordance with some implementations. As shown in FIG. 1, system 100 can include device(s) 110, as well as other systems, services, entities, etc., as described herein. Various elements can be connected to and/or otherwise communicate or transmit information, data, etc., to one another via various networks, connections, protocols, etc. (e.g., via the internet).

The referenced device(s) 110 can be, for example, a server computer, computing device, storage service (e.g., a "cloud" service), IoT device, sensor, system, function, and/or any other such device, system, or element capable of generating and/or, providing unstructured content 120, e.g., as described herein. By way of example, device(s) 110 can include a service that generates log(s) that reflect the status of a temperature sensor at various time intervals. By way of further example, device(s) 110 can include a service that generates log(s) that reflect various errors that occur during operation of a system. It should be understood that the examples provided herein are for illustrative purposes and that any number of other devices, services, etc., are also contemplated.

Unstructured content 120 can be content (e.g., as generated by device(s) 110) that contains little or no defined structure. Such unstructured content can include, for example, data logs, feeds, streams, etc. In certain implementations, such unstructured content can store or reflect data such as messages, events, telemetry data, sensor data, etc. Additionally, in certain implementations unstructured content 120 can include human generated content (e.g., messages, documents, etc.), as described herein. As described in detail herein, unstructured content 120 can be provided to and/or received by server 130.

Server 130 can be, for example, a server computer, computing device, services (e.g., a "cloud" service), etc. configured to receive and/or process content (including but not limited to unstructured content 120), as described herein. In certain implementations, server 130 can include content processing engine 132, query processing engine 134, monitoring engine 136, structured content repository 140, and/or parameter repository 150.

Figure 4:
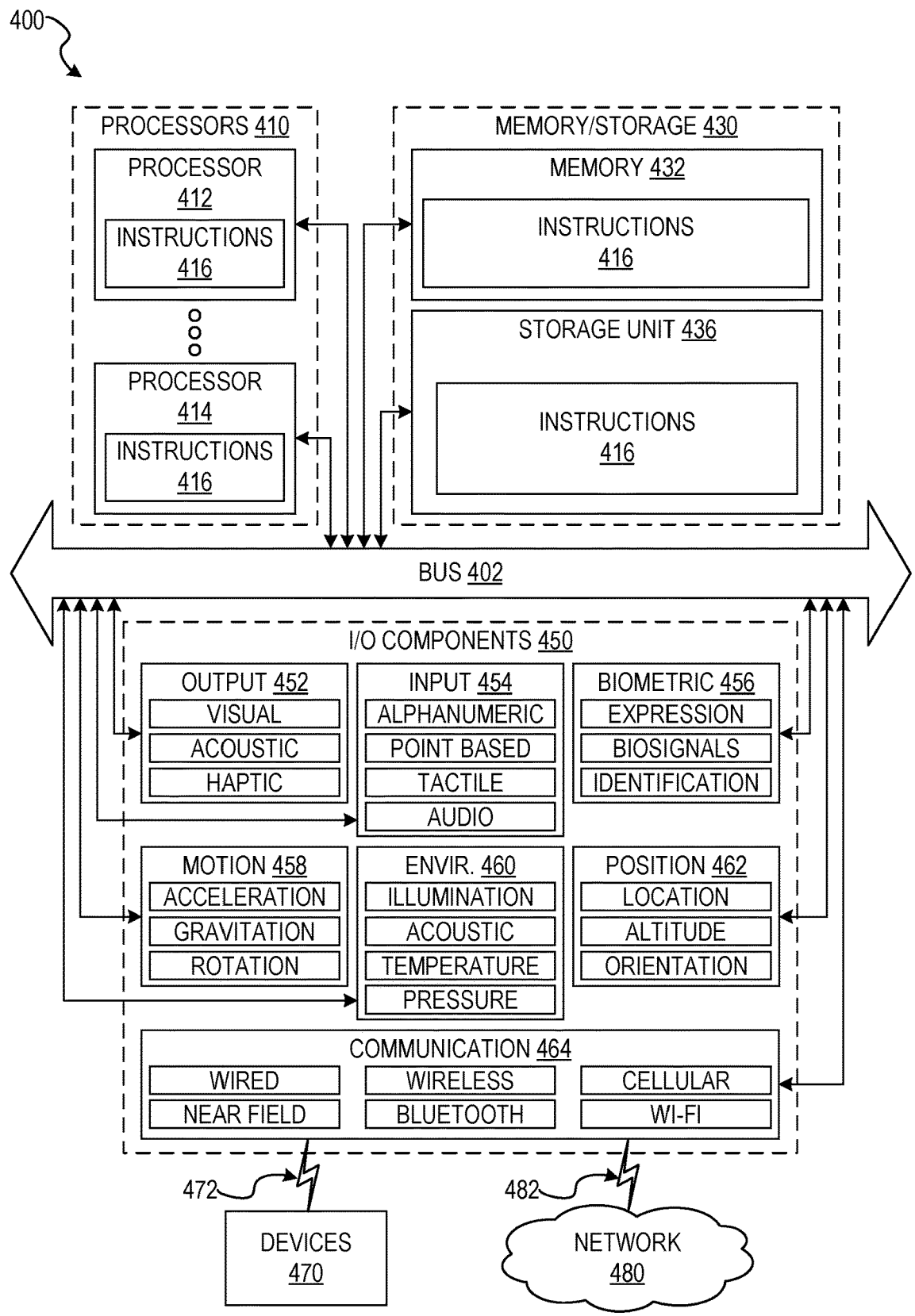
FIG. 4 is a block diagram illustrating components of a machine able to read instructions from a machine-readable medium and perform any of the methodologies discussed herein, according to an example embodiment.

Content processing engine 132 can be a program, module, or set of instructions that configures/enables server 130 to perform various operations such as are described herein. Such instructions, etc., can be stored in memory of the device (e.g. memory 430 as depicted in FIG. 4 and described below). One or more processor(s) of the device (e.g., processors 410 as depicted in FIG. 4 and described below) can execute such instruction(s). In doing so, the device can be configured to perform various operations, such as those described herein. For example, content processing engine 132 can configure server 130 to parse unstructured content, extract parameters from such content, generate a structured representation of such content, and/or perform other operations as described herein.

In certain implementations, content processing engine 132 can generate various structured content elements. Such structured content elements can include or reflect representation(s) of parameters and/or other elements identified within and/or extracted from unstructured content 120. In certain implementations, the referenced structured content elements can be stored in structured content repository 140. Structured content repository 140 can be, for example, various storage resource(s) such as an object-oriented database, a relational database, a key-value database, a graph database, memory, etc. with respect to which data (e.g., parameters, records, objects, etc., such as those referenced herein) can be stored, indexed, and/or retrieved.

By way of further illustration, in certain implementations content processing engine 132 and/or server 130 can be configured to process the referenced unstructured content (logs, feeds, streams, etc.) and identify, generate, and/or impose one or more structure(s) on it. In doing so, information from the unstructured logs, etc. can be extracted into a structured format such as a database. Such extracted data can be indexed in a database, thereby enabling various query tools/adapters to access and/or retrieve content from the structured database. In other scenarios, the referenced information (extracted from unstructured logs, etc.) can be structured in other formats such as JSON, XML, etc. In doing so, other systems, services, applications, etc., can leverage content originating from the referenced unstructured logs, etc., in numerous contexts.

For example: an unstructured log file can contain information pertaining to various system occurrences (e.g., as maintained in a chorological sequence with timestamps reflecting the date/time of each occurrence). Examples of such occurrences include but are not limited to various types of errors, status of a service or application, a sensor reading (reflecting, for example, a temperature of a component), time, etc.

Figure 2:
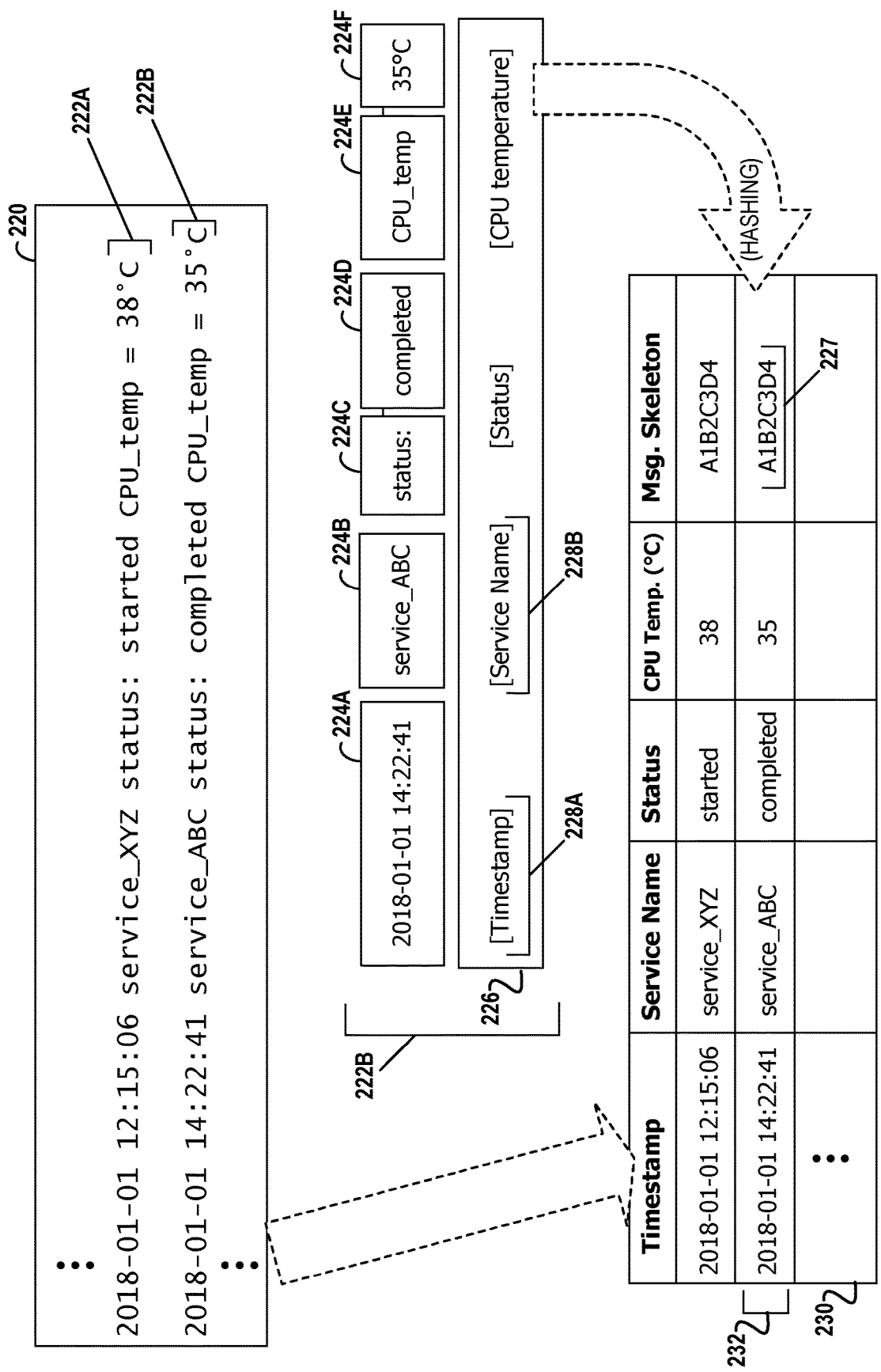
FIG. 2 illustrates example scenarios described herein, according to example embodiments.

By way of illustration, FIG. 2 depicts an example log 220. It can be appreciated that while such a log may contain certain information (e.g., types of errors, various temperatures, etc.), the unstructured nature of such content may preclude various operations from being performed. For example, it may be difficult or impossible to perform a query on such unstructured log data to identify errors of a certain type that occurred for a specific service within a defined range of temperatures. Accordingly, as described in detail herein, the disclosed technologies can identify various parameters within such a log (e.g., errors, temperatures, etc.) and generate an index configured to process such queries. In doing so, the described operations (e.g., requesting a range of values contained within the referenced unstructured content) can be performed efficiently and/or at near real-time (e.g., after the referenced unstructured content is generated and/or provided).

As described in greater detail herein, the disclosed technologies can be configured to impose/model a structure (e.g., in a defined format, such as a time driven stream) for previously unstructured content. In certain implementations, the unstructured content is parsed and various parameters are extracted, evaluated, and adaptively adjusted to be classified (e.g., as one or more of: time index, variable, enumerated variable, source, labels etc.). The referenced classification can then be used to index the content into a structured format such as a key value, time series, or graph database structure. Various queries, such as free text queries (received with respect to the database) can be adjusted/adapted to match the given classifications. Further aspects of these (and other) operations are described in detail herein.

In certain implementations, content processing engine 132 can generate and/or utilize parameter repository 150. Parameter repository 150 can be, for example, various storage resource(s) such as an object-oriented database, a relational database, memory, etc. with respect to which content elements, parameters, etc. that are common to multiple content segments can be stored. In certain implementations, repository 150 can be configured to function as a dictionary or lexicon with respect to various operations, as described herein.

Additionally, in certain implementations, various parameters stored within repository 150 can be provided by external source(s), such as service(s) 180 (which can be third party services such as information services, social network services, etc.). By way of illustration, a financial information service can provide content corresponding to various strings, symbols, or abbreviations that commonly reference various entities, e.g., within financial data streams or feeds. Such content can be stored in parameter repository 150 and/or utilized by content processing engine 132, e.g., when processing unstructured content 120, as described herein.

As shown in FIG. 1, server 130 also includes query processing engine 134. Query processing engine 134 can be a program, module, or set of instructions that configures/enables server 130 to perform various operations such as are described herein. In certain implementations, query processing engine 134 can be generated, updated, and/or configured by content processing engine, e.g., in conjunction with the extraction and classification of various parameters, as described herein. For example, in certain scenarios, various aspects of the arrangement of content elements within a content segment may change as a result of the described operations. Accordingly, query processing engine 134 can be configured to receive queries from various external source(s) (e.g., device(s) 160, as shown) and to process such queries (which can be, for example, free text queries) to account for the original arrangement of unstructured content 120.

In certain implementations, server 130 can also include monitoring engine 136. Monitoring engine 136 can be a program, module, or set of instructions that configures/enables server 130 to perform various operations such as are described herein. In certain implementations, monitoring engine 136 can periodically and/or continuously scan content, records, entries, updates, etc., within structured content repository, e.g., with respect to various defined rules. Such rules can reflect various thresholds (e.g., whether a particular parameter—e.g., temperature—exceeds a defined value), trends (e.g., a 25% increase in errors in the past hour), and/or other phenomena. Upon identifying such occurrences, various operations can be initiated, e.g., with respect to device(s) 170 (as shown in FIG. 1).

Further aspects and features of system 100 are described in more detail below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 3A:
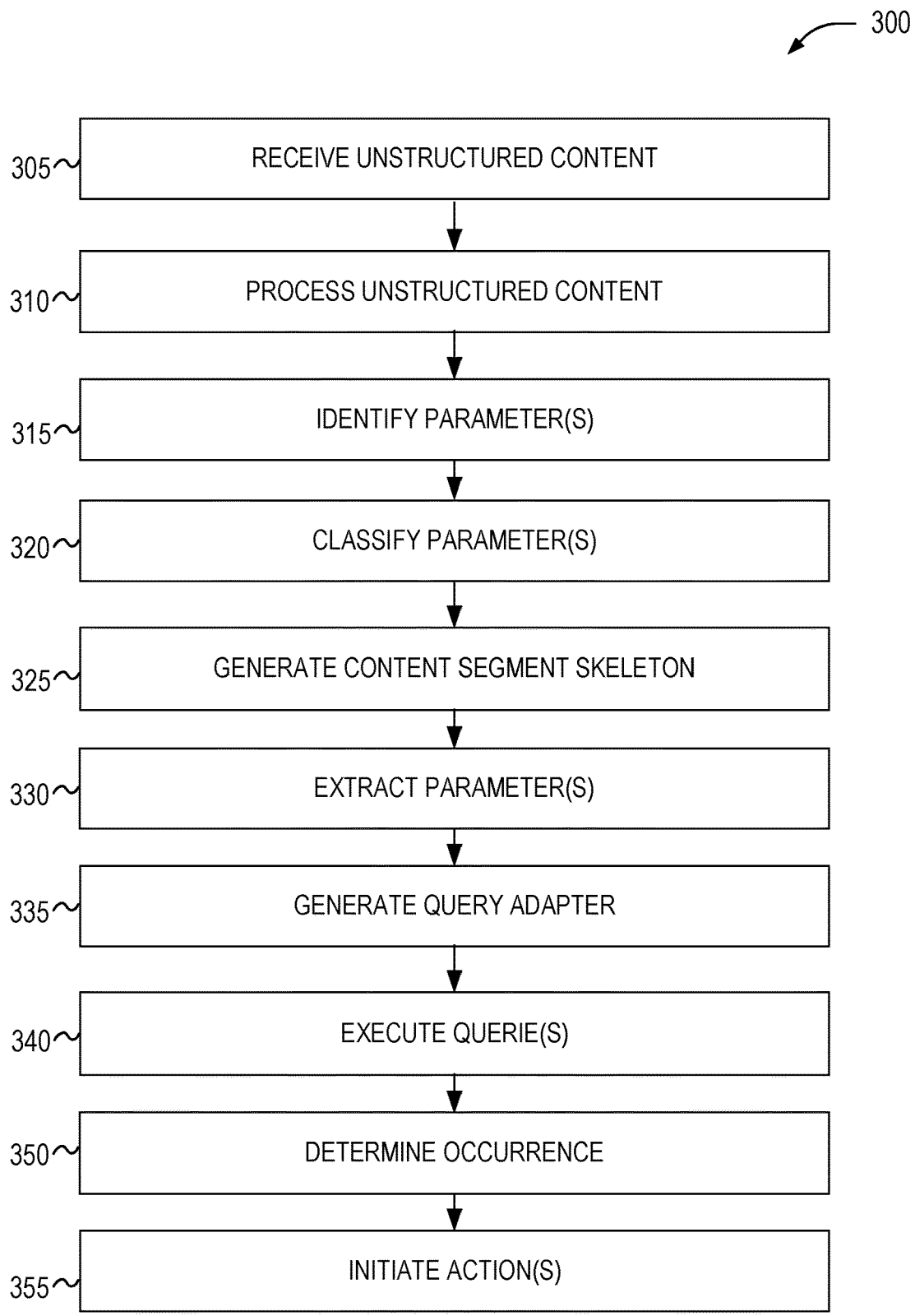
FIGS. 3A-3B are flow charts illustrating method, in accordance with an example embodiment, for structuring unstructured machine-generated content.

FIG. 3A is a flow chart illustrating a method 300, according to an example embodiment, for structuring unstructured machine-generated content. The method is performed by processing logic that can comprise hardware (circuitry, dedicated logic, etc.), software (such as is run on a computing device such as those described herein), or a combination of both. In one implementation, the method 300 is performed by one or more elements depicted and/or described in relation to FIG. 1 (including but not limited to server 130, content processing engine 132, query processing engine 134, and/or monitoring engine 136), while in some other implementations, the one or more blocks of FIG. 3A can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 305, content, such as unstructured content, is received. For example, as shown in FIG. 1 and described herein, device(s) 110 can provide unstructured content 120, which can be received by server 130 and/or content processing engine 132. As described herein, such unstructured content can be machine-generated content such as data logs, feeds, streams, etc. that contains little or no defined structure. Moreover, in certain implementations unstructured content 120 can include and/or reflect human generated content (e.g., messages, documents, etc.).

At operation 310, the unstructured content (e.g., as received at 305) is processed. In doing so, various content segment(s) can be identified. Such content segments can reflect, for example, a grouping or arrangement of various content elements within unstructured content 120. For example, FIG. 2 depicts unstructured content 220 which can be a log file containing various log entries associated with a system or device. As shown in FIG. 2, log 220 can include content segment(s) 222A and 222B which can be various entries in a log generated at various points in time.

In certain implementations, the referenced unstructured content can be parsed or partitioned based on various factors, e.g., in order to identify the referenced content segments (lines, messages, sentences, documents, etc.) within the unstructured content. For example, in certain implementations the identification of various elements (e.g., a timestamp, certain delimiters, etc.) can reflect the beginning and/or end of a content segment. For example, as shown in FIG. 2, the identification of a timestamp (e.g., "2018- . . . ") can reflect the beginning of a new content segment. In certain implementations, such a determination can be computed based on content stored in parameter repository 150 (reflecting various element(s) that can reflect the beginning/end of a content segment, as described herein). In other implementations, such a determination can be computed based on the processing of other content within the referenced unstructured content (e.g., patterns or arrangements previously identified in other entries within the unstructured content being processed and/or other unstructured content).

As noted above, in certain implementations the referenced unstructured content can include and/or incorporate human generated content (e.g., human composed messages, documents, etc.). In such scenarios, the referenced human generated content can be processed using various language processing techniques (e.g., natural language processing).

At operation 315, one or more parameters are identified. In certain implementations, such parameter(s) are identified within a first content segment (e.g., a content segment identified at 310). For example, as shown in FIG. 2, having identified a content segment 222B within unstructured content 220, the identified content segment can be iteratively processed to identify various parameters 224 present within the segment. By way of illustration, parameters 224A ("2018-01-01 14:22:41"), 224B ("service_ABC"), etc., can be identified within content segment 222B.

At operation 320, one or more parameters (e.g., those identified at 315) are classified. For example, as shown in FIG. 2, having identified various parameters 224 within content segment 222B, the identified parameters can be further processed to determine various characteristics reflected by and/or associated with such parameters. In doing so, such parameters can be further extracted and structured in a manner that enables such content to be effectively indexed, queried, retrieved, etc., as described herein. Additionally, classifying various parameters (e.g., in a manner described herein) enables extraction of the role(s) of the various parameter(s) within a content segment (e.g., in addition to extraction of data structure(s) associated with the content, as described herein). In doing so, the described technologies can further identify/determine parameter(s) that can be utilized as an index (e.g., to retrieve content, parameters, etc., as described herein).

In certain implementations, the referenced parameters (e.g., parameters 224 as shown in FIG. 2) can be identified and/or classified based on one or more factors. For example, in certain implementations a parameter can be classified based on a string pattern identified within the parameter. By way of illustration, in certain implementations the referenced parameters can be identified/classified based on characteristics such as content/numeric identification that follows various common/defined representations (e.g., double, int, Base64, Hex, etc.). Such characteristics can also include or reflect, for example, various time string identification (e.g., structured such as a timestamp, relative to another point in time, etc.). Additionally, in certain implementations mixed numeric and string words can indicate an enumerated parameter or hierarchy, and such characteristics can be accounted for in identifying/classifying the referenced parameter(s), as described herein.

By way of illustration, various string patterns can follow defined formats such as those associated with credit card numbers, social security numbers, serial numbers, network addresses, machine identifiers, globally unique identifiers (GUID), unique identifiers (UID), email addresses, phone numbers, address structures, URLs, etc. Accordingly, the referenced parameters (e.g., those identified at 315) can be processed, analyzed, etc., to determine whether such parameters exhibit or reflect one or more of the referenced string patterns (and can be further classified accordingly based on such a determination). For example, parameter 224A ("2018-01-01 14:22:41") as shown in FIG. 2 can be determined to reflect a string pattern corresponding to a timestamp.

By way of further example, in certain implementations a parameter can be identified and/or classified based on a source of the unstructured content. For example, in certain implementations unstructured content 120 can be associated with and/or reflect aspects of a device, service, application, etc. from which such unstructured content originates (e.g., a machine identifier or address reflecting that the device is a particular type of sensor). Accordingly, parameters within the referenced unstructured content can be classified based on the referenced characteristics. For example, unstructured content from certain devices/services may contain various content elements, fields, sequences, etc., and such characteristics can be accounted for in classifying the referenced identified parameters 224, as described herein.

In certain implementations, the referenced parameter(s) can be identified and/or classified based on/with reference to content stored in parameter repository 150. As described herein, parameter repository 150 can include or reflect a corpus, dictionary, lexicon, etc. that includes strings, phrases, words, elements, etc. (and/or aspects or characteristics thereof) that may be included or reflected in various types of unstructured content. As described herein, in certain implementations parameter repository can be configured or loaded by external devices or services 180, e.g., in order to reflect content with respect to which server 130 and/or content processing engine 132 is configured with respect to. Additionally, as described herein, in certain implementations content processing engine 132 can configure and/or update parameter repository, e.g., with strings, phrases, words, or content determined to be unique (e.g., with respect to a particular application or type of unstructured content). In other implementations, various strings, phrases, words, or content determined to repeat (e.g., within the referenced unstructured content) and are further determined not to be present within the referenced dictionary (e.g., parameter repository 150), can be determined to be likely to be unique enumerators (and can be identified/classified accordingly, as described herein).

As described herein, the described technologies can generate and/or maintain parameter repository 150, which can operate as a dictionary containing a vocabulary that reflects characteristics of various parameters identified within unstructured content. In certain implementations, the described identification/classification operations (e.g., with respect to unstructured content) can further generate and/or update such a dictionary and/or its vocabulary, as described herein (e.g., with elements, parameters, etc. identified within the referenced unstructured content that are part of the vocabulary of the data).

In certain implementations, parameter repository 150 can be configured to represent various common/repeating strings, phrases, elements, etc., e.g., in an enumerated searchable format. The contents of parameter repository 150 can be utilized/accounted for when identifying/classifying various parameters, e.g., in a manner described herein. For example, in a scenario in which certain content is identified as being present within the referenced dictionary, such content can be replaced with or otherwise represented by the enumerated value of the identified word, phrase, etc. Additionally, in certain implementations such operations and/or content analysis can be performed based on the statistical nature of the content, words, parameters, etc., e.g., after ruling out or disqualifying such content upon determining it is part of a regular natural vocabulary.

In certain implementations, the described technologies can be configured to perform the described operation(s) by providing or pushing the referenced content, words, phrases, etc. into a radix tree. Upon determining, for example, that certain content, word, phrase, etc. has high cardinality, it can be marked as an enumeration.

By way of further example, in certain implementations a parameter can be identified and/or classified based on a classification of another parameter, e.g., within another content segment. For example, as shown in FIG. 2, the described technologies can identify content segment 222A within unstructured content 220 and can further identify various parameters within content segment 222A (e.g., a timestamp, etc.), e.g., in a manner described herein. Accordingly, upon processing content segment 222B, various aspects of the identification/classification of content elements within content segment 222A can be utilized/accounted for in identifying/classifying content elements within content segment 222B. For example, based on the identification/classification of a timestamp within content segment 222A, content determined to be related/comparable within content segment 222B can be determined to be likely to also be a timestamp.

By way of further example, in certain implementations a parameter can be identified and/or classified based on a classification of another parameter in the first content segment. By way of illustration, it can be appreciated that a content segment may include content arranged and/or sequenced in a manner that can reflect various relationships or associations between content segments. For example, as shown in FIG. 2, unstructured content 220 can include the string(s) "CPU_temp=35° C." Accordingly, upon determining that "CPU_temp" corresponds to a parameter relating to temperature (e.g., based on the string "temp" within the parameter, based on input from parameter repository 150 as described herein, etc.), it can be further determined that the proximate string "35° C." is likely to be a parameter corresponding to a temperature value. Accordingly, the described technologies can identify and/or classify such a parameter, e.g., as described herein.

As noted, in certain implementations identifying and/or classifying various parameters (e.g., in a manner described herein) can enable extraction of the role(s) of the various parameter(s) within a content segment (e.g., in addition to extraction of data structure(s) associated with the content, as described herein). In doing so, the described technologies can further identify/determine parameter(s) that can be utilized as an index (e.g., to retrieve content, parameters, etc., as described herein). In certain implementations, such classifying can be implemented in multiple stages in which the type of a given value/parameter is determined and/or tagged.

By way of illustration, in certain implementations various contextual identifiers (such as those that reflect or indicate a source of the content, message, content segment, etc.) can be identified, and various parameter(s) can be classified based on such identifier(s). Such contextual identifiers can be, for example, a hierarchal value. Additionally, in certain implementations various label names (such as those that reflect or indicate the role of the values adjacent or proximate to them) can be contextual identifiers and processed/identified as dimensions. Moreover, in certain implementations various identified values (e.g., within a content segment) can be processed/identified as contextual identifiers. For example, based on the identification/determination that previous values are associated with a particular type/role, subsequent identification of the same/similar value can suggest it is the same type/role (and such parameters can be identified/classified accordingly).

Additionally, in certain implementations various contextual parameters can be used to identify/classify other parameters within a content segment, message, etc. Such contextual parameters can reflect, for example, a source of the content segment, message, and/or unstructured content. By way of illustration, such contextual parameters can act as the subject of the log, message, unstructured content, etc. and indicated the source of the content (e.g., from a defined system, node, service, etc.).

By way of further example, the described technologies can be further configured to identify and/or classify parameters such as labels (which can reflect and/or be associated with a content arrangement such as: <key, value>) within content segment/unstructured content. In certain implementations, the referenced keys (e.g., within/associated with the referenced label) can be determined to have high cardinality.

Additionally, in certain implementations the referenced label key(s) can be identified, determined, classified, and/or inferred over several content segments, messages, etc. (e.g., in a scenario in which the label is the subject of the message), e.g., by correlation of values across multiple messages. In certain implementations, label values can be associated with the label keys that precede them.

Moreover, in certain implementations the referenced contextual parameters can be identified, determined, classified, and/or inferred based on values identified within the content segment, message, etc. and/or various related elements or 'hints' that are proximate to the label(s) and/or which otherwise suggest various aspects of the referenced labels (e.g., units related to temperature, currency, etc.).

By way of illustration, in certain implementations the identification of various syntactic elements can serve as indicators or 'hints' with respect the identification of connections between values and/or as indications of the referenced parameters. For example, "value" appearing within such unstructured content can reflect or indicate a quoted value. By way of further example, "< ... >" or "[ ... ]" or "( ... )" and other such elements can be identified as indicators for parameters (where a descriptive label may also precede).

In some cases, the referenced labels may not appear explicitly within a content segment/unstructured content. However, it may be advantageous to identify and assign implicit labels, e.g., due to existence of various functionality, operations, etc. pertaining to such labels. In such scenarios, the described technologies can be configured to determine that a label is implicit or suggested within the content and can further generate and assign a label name.

It should be noted that, in certain implementations, various adaptive and/or machine learning techniques, etc., can be utilized to further identify and/or classify the described parameters.

Additionally, in certain implementations various aspects of the described technologies can be configured and/or adapted with respect to human-generated content. That is, it can be appreciated that while in certain implementations unstructured content 120 (as shown in FIG. 1 and described herein) can be machine generated content, in other implementations such content (and/or portions thereof) can be human-generated (e.g., messages, documents, etc., created by human users).

For example, in certain implementations such human generated content can be processed using natural language processing and/or other such techniques. In doing so, various elements within such content and/or relationships between such elements can be identified and/or extracted. Such relationships can be utilized, e.g., to guide and/or reinforce various aspects of the classification of such elements. process. Examples of various identifiers that can be identified within the referenced unstructured human generated content include but are not limited to: time relative to establish a time line, subject-verb-object-adjectives to determine the classification of the metric (which may often be the subject) and labels (adjectives). Additionally, in certain implementations a verb can be used for modeling the operational flow of the content source.

At operation 325, a content segment skeleton is generated. In certain implementations, such a content segment skeleton can reflect various aspects of an arrangement of the first content segment (e.g., as identified at 310). For example, as described herein, the referenced content segment skeleton can be a signature that reflects the arrangement, sequence, etc. of parameters within the content segment, relationships/ associations between such parameters, and/or other content contained within a content segment (e.g., that has not been classified).

As described herein, in certain implementations the referenced content segment skeleton (e.g., content segment skeleton 226 as shown in FIG. 2) can be further processed (e.g., using a hashing function such as SHA-1, xxHash, cyclic redundancy check (CRC), etc.) to transform the content segment skeleton into a numerical representation. Such a representation can be further stored/maintained with a structured representation of the described content segment, as described herein. By way of illustration, FIG. 2 depicts representation 227 of content segment skeleton 226 as stored within database 230.

In certain implementations, one or more parameters (such as those identified at 315 and/or classified at 320) are substituted, e.g., within the first content segment (e.g., as identified at 310). Such parameters can be substituted with various type qualifiers, such as those determined to correspond to the identified/classified parameters. For example, FIG. 2 depicts type qualifiers 228A ('Timestamp') and 228B ('Service Name') substituted for parameters 224A and 224B, respectively, within content segment skeleton 226.

Additionally, in certain implementations a content segment skeleton can reflect an arrangement of the referenced type qualifiers within a content segment. For example, as shown in FIG. 2, content segment skeleton 226 can reflect the sequence of the referenced type qualifiers within content segment 222B ('Timestamp,' 'Service Name,' 'Status,' etc.).

At operation 330, one or more parameters are extracted. In certain implementations, such parameters (such as those identified at 315 and/or classified at 320) are extracted from a first content segment (e.g., the content segment identified at 310) into a structured content element. Such a structured content element can be or include a representation of the referenced parameter(s) in a structured content format (e.g., a database format). In certain implementations, the manner in which the referenced parameter(s) are extracted and/or represented can be determined based on the classification of the parameter (e.g., at 320).

FIG. 2 depicts various aspects of the extraction and/or representation of the referenced parameters in a structured content format. As shown in FIG. 2, in certain implementations the structured content element (e.g., a row 232 in database 230) can include a representation 227 (e.g., a hash) of the content segment skeleton 226.

By way of further illustration, in certain implementations the referenced extraction operation(s) can generate and/or output structured content in various formats. In certain implementations, such content can be structured to reflect the time/timestamp associated with a content segment, a skeleton signature associated with the content segment (e.g., as generated in a manner described herein), and/or a vector of parameter(s), such as those extracted in a manner described herein. In certain implementations, the referenced vector of parameters can include extracted parameters such as <time, value, metadata hints—e.g., as identified from natural language processing and/or formatting indicators, etc.)>.

It should be noted that, in certain implementations the described technologies can be configured such that the extracted parameters do not include time parameter(s) (e.g., in scenarios when such a parameter may not be necessary for subsequent queries and/or is not present in the original source data). In such scenarios, an index such as a synthetic index can be added, e.g., to reflect or symbolize the arrangement, sequence, order, etc. of the content, e.g., within the unstructured data source.

Moreover, in certain implementations the referenced parameter(s) (e.g., from the first content segment) can be indexed into a database format. For example, the parameters, labels, other content, etc., identified, classified, extracted, etc. in the manner described herein can be modeled and/or otherwise arranged, structured, and/or indexed in various ways. For example, such content can be modeled, for example, as a structured set that includes a timestamp, the generated content segment skeleton (e.g., a skeleton message enumerator), and a set of labeled content/data. Such labeled data can be arranged or ordered, for example, as <key, value> or value only, and can further include metadata hints tuples, such as are described herein. Additionally, in certain implementations the source of the unstructured content, content segment, message, etc., can also be included (e.g., tagged as another label).

The described indexing operation(s) can further include various determination(s) with respect to which whether various query adaptation(s) or adjustments may be advantageous, e.g., to enhance or facilitate access to and/or retrieval of content from the referenced structured content. As described herein, in certain implementations a query adapter can be generated, provided, and/or otherwise configured with respect to the generated content structure/index. As described herein, such a query adapter can include or incorporate a search interface configured with respect to the structure of the content/index, and through which content can be retrieved therefrom. Additionally, in certain implementations a search interface can be configured to receive queries from a user (e.g., free text search input), and adapt such queries with respect to the underlying representation of the content/structure of the index, as described herein.

As described herein, the described parameters, labels, other content, etc. can be modeled and/or otherwise arranged, structured, and/or indexed in various ways, formats, etc. (and/or in combinations thereof). In one example, such content can be modeled or indexed as rows in a key-value database. In another example, such content can be modeled or indexed as metrics in a time series database. It should be understood that such formats are provided by way of example and that any number of other content modeling/indexing approaches, formats, etc., are also contemplated. It should also be appreciated that, as described herein, by extracting, classifying, and/or indexing the referenced content into the described structured format(s), various queries, searches, etc. (e.g., SQL queries), can be performed with respect to the content, and performance of such search can be increased dramatically, as described herein.

As noted, in certain implementations the described parameters, labels, other content, etc. can be modeled, structured, and/or indexed as a key-value database. In doing so, various content segment(s), message(s), etc., can be extracted or indexed, e.g., as respective rows within the key-value database. Each such row can be maintained under the label keys, skeleton index and/or timestamp index.

In order to perform queries on content/data within the database, users/services can utilize various SQL techniques, e.g., with respect to keys and values. Such query techniques can enable fine-grained queries and/or aggregations (e.g., using group-by queries).

Additionally, in certain implementations the referenced database can be queried via "free text" queries. In such a scenario, the described technologies can perform a query corresponding to the value of the received free text across multiple type-compatible fields. The results of such querie(s) can then be intersected (e.g., in case multiple query qualifiers were provided) or joined (e.g., in case results are yielded from multiple fields), as described herein.

Additionally, as noted, in certain implementations the described parameters, labels, other content, etc. can be modeled, structured, and/or indexed as a time series database (e.g., in scenarios in which the referenced content segments, messages, etc., contain timestamps, such as logs, events, etc.). In doing so, various content segment(s), message(s), etc., can be extracted or indexed, e.g., as a metric sample. The referenced labels can be designated as time series labels (thereby allowing for efficient query and aggregators) or designated as sample data. In certain implementations, labels with no keys (only values) can be indexed as vectors of time series data. It can be appreciated that such a structure can leverage high compaction level and provides the ability to perform high-performance queries.

In certain implementations the referenced time series database can be queried via various aggregation driven techniques. Such a query pattern can enable user(s) or service(s) to query the data by the combinations of values per labels and metrics and allows aggregation and extraction of trends on the data.

Additionally, in certain implementations queries such as "free text" can be processed with respect to a query adapter such as an auxiliary free text structure generated and/or configured with respect to the referenced database. That is, it can be appreciated that, in certain scenarios, extracting various elements from a content segment, message, etc., into a structured formal (e.g., in a manner described herein) can complicate or preclude the performance of various free text search queries with respect to the original (unstructured) form of the content. For example, certain free text queries may span multiple content elements that are proximate or adjacent to one another in the original unstructured content but are not necessarily proximate or associated once extracted and stored in the described database. Accordingly, as described herein, a query adapter such as a free text auxiliary structure (e.g., query processing engine 134 as shown in FIG. 1) can be generated and/or provided.

In certain implementations, such a query adapter, such as a free text auxiliary structure, can be configured to map various structuring operations into query rules that are utilized with respect to free text search. Such a query adapter/free text auxiliary structure can be configured to connect between dictionary entries (e.g., those stored in parameter repository 150) and labels, such as those referenced herein. Upon receiving a free text search phrase (e.g., that includes multiple words), the referenced query adapter can be configured to process each word individually and then dissect or intersect the results to yield a list of relevant content segments/messages (target messages). The words can be searched in columns containing textual data, or in dictionary entries (translated into enumerated index which is then searched on associated labels), or in message skeletons.

In a scenario in which a query is received for a combination of phrases, the referenced query adapter can generate a list of target message(s), reconstruct such messages (e.g., using the associated message skeleton), and search for the entire phrase, as described herein. Additionally, in certain implementations a further standard free text search structure can map the words referenced by any of the referenced parameters to further accelerate the search by allowing direct mapping from the user search phrase into the search operations to be performed on the underlying data.

It should also be noted that, in certain implementations, the described indexing operation(s) can be adapted based on queries received. For example, upon receiving various queries with respect to certain parameters, various aspects of the identification, classification, and/or indexing described herein can be adjusted or adapted to account or optimize for such queries.

At operation 335, a query adapter is generated. In certain implementations, such a query adapter can be generated based on a structured format (e.g., the database structure/format with respect to which the referenced parameters are extracted). In certain implementations, the referenced query adapter can be generated based on/in view of the arrangement of the first content segment (e.g., content segment 222B, as shown in FIG. 2) as reflected in the content segment skeleton (e.g., content segment skeleton 226, as shown in FIG. 2).

At operation 340, one or more queries are executed. In certain implementations, such queries are executed via the query adapter (e.g., as generated at 335) and the structured format (e.g., the database structure/format with respect to which the referenced parameters are extracted). Further aspects of operation 340 are described herein, e.g., in relation to FIG. 3B.

In certain implementations, upon receiving a query, the query adapter can be configured to execute a first portion of the query and a second portion of the query. The query adapter can further complete execution of the query based on a result of the execution of the first portion of the query and a result of the execution of a second portion of the query, as described in detail herein.

In certain implementations, the described technologies can be configured to process, parse, index, etc., the described unstructured content based on various aspects of querie(s) received and/or processed in relation to the described structured content (as generated based on the received unstructured content). For example, upon determining that multiple queries (e.g., a quantity above a defined threshold, a percentage above a defined threshold, etc.) are directed to certain parameters (and/or combinations thereof), the described technologies can configure or adjust various aspects of the generated structure/format, e.g., in order to facilitate and/or improve performance, efficiency, etc., with respect to such queries.

At operation 350, an occurrence of an event is determined. In certain implementations, such an occurrence can be determined based on content associated with various structured content elements (e.g., as stored in structured content repository 140).

By way of further illustration, it can be appreciated that by generated and imposing a structure on the described content, various rules can be generated and applied, e.g., in order to monitor for various occurrences, phenomena, etc. For example, having generated a structure with respect to a log file that includes fields relating to temperature, a monitoring rule can be defined to determine if/when such a temperature exceeds a defined threshold (e.g., above 100 degrees, increases more that 25% over a defined time interval, etc.). Doing so further enables various actions or operations to be initiated based on the occurrence of such events, as described herein.

At operation 355, one or more actions are initiated. In certain implementations, such actions are initiated based on the determined occurrence (e.g., at 350). For example, one or more alerts, notifications, etc., can be generated and/or provided to various device(s) 170. By way of further example, in certain implementations one or more operations can be initiated with respect to other machines, devices, etc., e.g., in order to address, remedy, etc. the referenced occurrence.

Figure 3B:
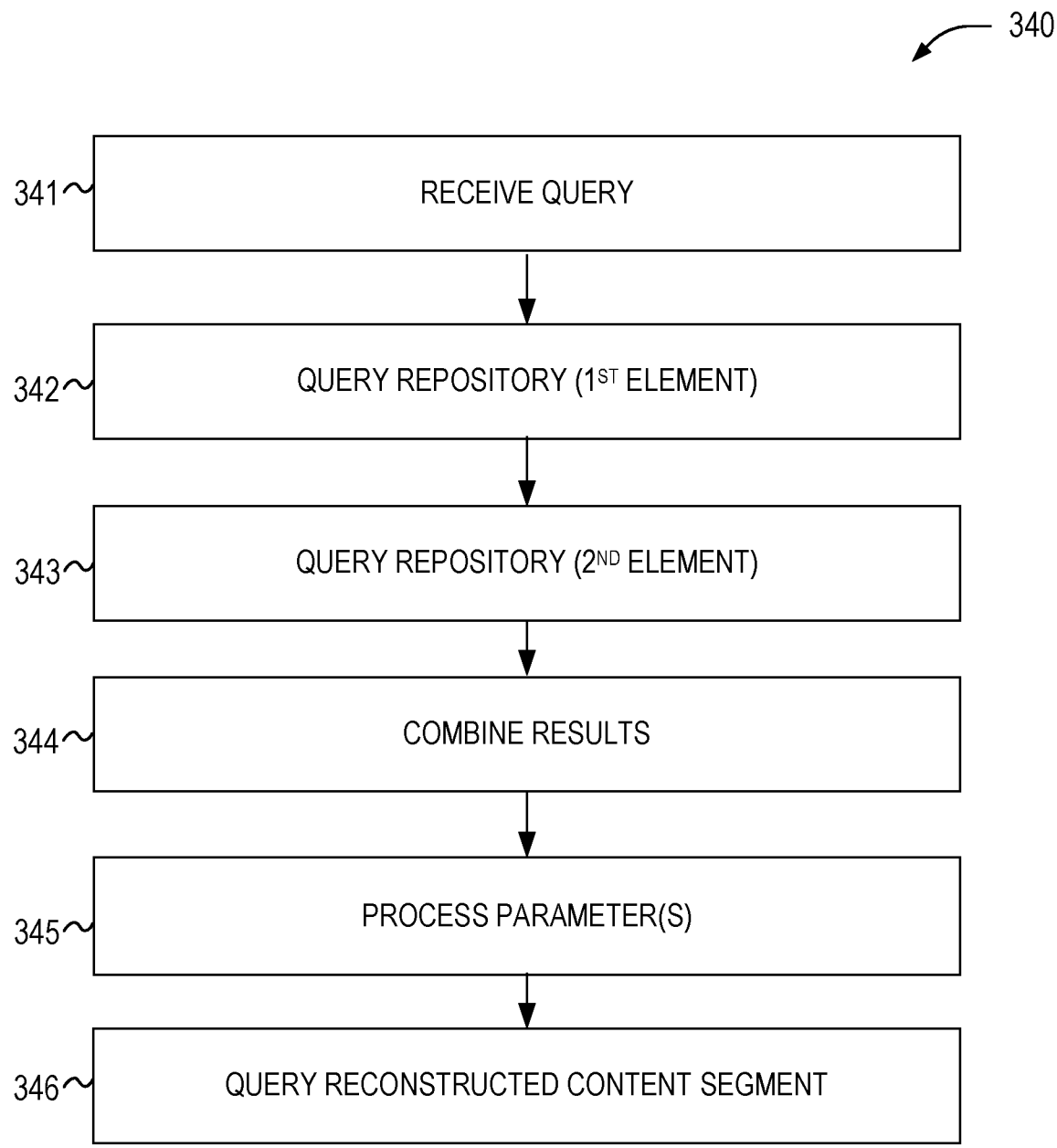

FIG. 3B is a flow chart illustrating a method 340, according to an example embodiment, for structuring unstructured machine-generated content and processing queries (e.g., free text queries) with respect to such structured content. In certain implementations, method 340 can reflect further aspects (e.g., sub-routines) of operation 340 as depicted in FIG. 3A and described herein. The method is performed by processing logic that can comprise hardware (circuitry, dedicated logic, etc.), software (such as is run on a computing device such as those described herein), or a combination of both. In one implementation, the method 300 is performed by one or more elements depicted and/or described in relation to FIG. 1 (including but not limited to server 130, content processing engine 132, query processing engine 134, and/or monitoring engine 136), while in some other implementations, the one or more blocks of FIG. 3B can be performed by another machine or machines.

At operation 341, a search query is received. In certain implementations, such a search query can be a query that contains multiple elements (e.g., words, strings, etc.), such as a free text search query. For example, a free text query can include multiple query element(s) (e.g., words, strings, etc.) to be searched. In certain implementations, such a search query can be received with respect to a structured content repository, such as is described herein (e.g., structured content repository 140 as shown in FIG. 1). As described herein, such a structured content repository can include various structured content elements that are generated based on unstructured content (e.g., from content originating from a log file, feed, etc.).

By way of further illustration, a query such as "completed CPU_temp" can be received as a free search input (e.g., via query processing engine 134 as shown in FIG. 1). Such a query can seek results such as records that include the words or strings "completed" and "CPU_temp" arranged in sequence (e.g., as originally arranged in unstructured content 220 as shown in FIG. 2). It can be appreciated that the structured representation of content segment 222B (e.g., row 232 of database 230, as shown in FIG. 2) may not directly reflect the arrangement of such words, strings, etc., within the original unstructured content 220.

At operation 342, the structured content repository is queried, e.g., with respect to a first query element from the search query (e.g., the search query received at 341). In doing so, a first query result can be generated or otherwise identified. For example, the referenced free text search query (here, "completed CPU_temp") can be parsed or deconstructed (e.g., into individual query elements, such as individual words, strings, etc.), and queries of the structured content repository 140 can be performed with respect to such query elements. For example, the various records that contain the word/string "completed" can be identified within structured content repository 140.

At operation 343, the structured content repository is queried, e.g., with respect to a second query element from the search query (e.g., the search query received at 341). In doing so, a second query result can be generated or otherwise identified. For example, the referenced free text search query (here, "completed CPU_temp") can be parsed or deconstructed (e.g., into individual query elements, such as individual words, strings, etc.), and queries of the structured content repository 140 can be performed with respect to such query elements. For example, the various records that contain the word/string "CPU_temp" can be identified within structured content repository 140.

At operation 344, the query results can be combined. For example, a first query result (e.g., as generated at 342, reflecting records, etc., from the structured content repository that contain one query element) and the second query result (e.g., as generated at 343, reflecting records, etc., from the structured content repository that contain another query element) can be combined (e.g., intersected, joined, etc., as described herein). In doing so, structured content element(s) (e.g., from the structured content repository) that contain(s) the first query element and the second query element (that is, the various elements that make up the original search query) can be identified. For example, in the scenario described herein, those records from database 230 that contain both "completed" and "CPU_temp" can be identified.

At operation 345, parameter(s) of the identified structured content(s) element are processed. In certain implementations, such parameters can be processed with respect to a content segment skeleton (and/or a representation thereof) included or otherwise stored in relation to the identified structured content element(s). For example, as described herein, a content segment skeleton 226 (e.g., that reflects or represents an arrangement of various type qualifiers within a content segment, as described herein) can be utilized in relation to the referenced parameters. In doing so, a content segment can be reconstructed (e.g., by arranging the referenced parameters in the manner reflected by the content segment skeleton. For example, a content segment 222B from the unstructured content 220 (based on which the identified structured content element was generated) can be reconstructed.

At operation 346, the content segment (e.g., as reconstructed at 345) can be queried. In certain implementations, such a content segment can be queried with respect to the query (e.g., the free text search query) received at 341. For example, having reconstructed content segment 222B as shown in FIG. 2 (e.g., based on a content segment skeleton and the parameters stored in database 230 or another such structure), a query can be performed on such a reconstructed content segment (based on which it can be determined whether the referenced strings are present in the unstructured content, e.g., in the sequence reflected in the search query). In doing so, queries such as free text queries, can be performed in relation to structured content, and results otherwise reflected in the original unstructured content can still be achieved.

While many of the examples described herein are illustrated with respect to single server and/or individual devices, this is simply for the sake of clarity and brevity. However, it should be understood that the described technologies can also be implemented (in any number of configurations) across multiple devices and/or other machines/services.

It should also be noted that while the technologies described herein are illustrated primarily with respect to structuring unstructured machine-generated content, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-3B are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 4 is a block diagram illustrating components of a machine 400, according to some example implementations, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein can be executed. The instructions 416 transform the general, non-programmed machine into a particular machine programmed to carry out the described and illustrated functions in the manner described. In alternative implementations, the machine 400 operates as a standalone device or can be coupled (e.g., networked) to other machines. In a networked deployment, the machine 400 can operate in the capacity of a server machine or a client machine in a server-client network environment, or as a peer machine in a peer-to-peer (or distributed) network environment. The machine 400 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 can include processors 410, memory/storage 430, and I/O components 450, which can be configured to communicate with each other such as via a bus 402. In an example implementation, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 412 and a processor 414 that can execute the instructions 416. The term "processor" is intended to include multi-core processors that can comprise two or more independent processors (sometimes referred to as "cores") that can execute instructions contemporaneously. Although FIG. 4 shows multiple processors 410, the machine 400 can include a single processor with a single core, a single processor with multiple cores (e.g., a multi-core processor), multiple processors with a single core, multiple processors with multiples cores, or any combination thereof.

The memory/storage 430 can include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 can also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of the processors 410 are examples of machine-readable media.

As used herein, "machine-readable medium" means a device able to store instructions (e.g., instructions 416) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine (e.g., processors 410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 can include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 can include many other components that are not shown in FIG. 4. The I/O components 450 are grouped according to functionality merely for simplifying the following discussion and the grouping is in no way limiting. In various example implementations, the I/O components 450 can include output components 452 and input components 454. The output components 452 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 450 can include biometric components 456, motion components 458, environmental components 460, or position components 462, among a wide array of other components. For example, the biometric components 456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 can include acceleration sensor components (e.g., accelerometer), gravitation sensor components, rotation sensor components (e.g., gyroscope), and so forth. The environmental components 460 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 462 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 450 can include communication components 464 operable to couple the machine 400 to a network 480 or devices 470 via a coupling 482 and a coupling 472, respectively. For example, the communication components 464 can include a network interface component or other suitable device to interface with the network 480. In further examples, the communication components 464 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 can be another machine or any of a wide variety of peripheral devices (e.g., a peripheral device coupled via a USB).

Moreover, the communication components 464 can detect identifiers or include components operable to detect identifiers. For example, the communication components 464 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 464, such as location via Internet Protocol (IP) geolocation, location via Wi-Fi® signal triangulation, location via detecting an NFC beacon signal that can indicate a particular location, and so forth.

In various example implementations, one or more portions of the network 480 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 can include a wireless or cellular network and the coupling 482 can be a Code Division Multiple Access (CDMA) connection, a Global System for Mobile communications (GSM) connection, or another type of cellular or wireless coupling. In this example, the coupling 482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 can be transmitted or received over the network 480 using a transmission medium via a network interface device (e.g., a network interface component included in the communication components 464) and utilizing any one of a number of well-known transfer protocols (e.g., HTTP). Similarly, the instructions 416 can be transmitted or received using a transmission medium via the coupling 472 (e.g., a peer-to-peer coupling) to the devices 470. The term "transmission medium" shall be taken to include any intangible medium that is capable of storing, encoding, or carrying the instructions 416 for execution by the machine 400, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
    a processing device; and
    a memory operatively coupled to the processing device and storing instructions that, when executed by the processing device, cause the system to perform operations comprising:
        receiving unstructured content;
        processing the unstructured content to identify a first content segment;
        identifying, within the first content segment, one or more parameters;
        classifying the one or more parameters;
        within the first content segment, substituting the one or more parameters for one or more type qualifiers determined to correspond to the one or more parameters, thereby generating a content segment skeleton, the content segment skeleton comprising a hashed representation that reflects an arrangement of the first content segment; and
        based on the classifying of the one or more parameters, extracting the one or more parameters from the first content segment into a structured content element in a structured content format, wherein the structured content element includes the hashed representation of the content segment skeleton.

2. The system of claim 1, wherein generating a content segment skeleton comprises generating a content segment skeleton that reflects an arrangement of the one or more type qualifiers within the first content segment.

3. The system of claim 1, wherein classifying the one or more parameters comprises classifying a first parameter based on a string pattern identified within the first parameter.

4. The system of claim 1, wherein classifying the one or more parameters comprises classifying a first parameter based on a source of the unstructured content.

5. The system of claim 1, wherein classifying the one or more parameters comprises classifying a first parameter in the first content segment based on a classification of a second parameter in a second content segment.

6. The system of claim 1, wherein classifying the one or more parameters comprises classifying a first parameter in the first content segment based on a classification of a second parameter in the first content segment.

7. The system of claim 1, wherein extracting the one or more parameters comprises indexing the one or more parameters from the first content segment into a database format.

8. The system of claim 1, further comprising:
    determining an occurrence of an event based on content associated with one or more structured content elements; and
    initiating one or more actions based on the determined occurrence.

9. The system of claim 1, wherein a query adapter is generated in view of the arrangement of the first content segment as reflected in the content segment skeleton.

10. The system of claim 9, wherein executing one or more queries comprises:
    executing a first portion of a query;
    executing a second portion of a query; and
    completing execution of the query via the query adapter based on a result of the execution of the first portion of the query and a result of the execution of a second portion of the query.

11. The system of claim 9, wherein executing one or more queries comprises:
    receiving a free text search query comprising a first query element and a second query element;
    querying a structured content repository with respect to the first query element to generate a first query result;
    querying the structured content repository with respect to the second query element to generate a second query result;
    combining the first query result and the second query result to identify a structured content element within the structured content repository that contains the first query element and the second query element;
    processing the one or more parameters of the identified structured content element with respect to the content segment skeleton included in the structured content element to reconstruct the content segment from which the identified structured content element was generated; and
    querying the reconstructed content segment with respect to the free text search query.

12. The system of claim 1, wherein the unstructured content comprises human generated content.

13. The system of claim 12, wherein processing the unstructured content comprises applying one or more language processing techniques to the human generated content.

14. The system of claim 1, wherein the memory further stores instructions to cause the system to perform operations comprising:
    generating, based on the structured format, a query adapter; and
    executing one or more queries via the query adapter and the structured format.

15. A method comprising:
    receiving unstructured content;
    processing the unstructured content to identify a first content segment;
    identifying, within the first content segment, one or more parameters;
    classifying the one or more parameters;
    within the first content segment, substituting the one or more parameters for one or more type qualifiers determined to correspond to the one or more parameters, thereby generating a content segment skeleton, the content segment skeleton comprising a hashed representation that reflects an arrangement of one or more type qualifiers within the first content segment;
    based on the classifying, extracting the one or more parameters from the first content segment into a structured content element in a structured content format;
    generating, based on the structured format, a query adapter;
    receiving, via the query adapter, a search query;
    identifying, with respect to the search query, a plurality of query results;

combining one or more of the identified query results to identify a structured content element that contains elements of the search query;

processing one or more parameters of the identified structured content element with respect to a content segment skeleton included in the structured content element to reconstruct the content segment from the unstructured content based on which the identified structured content element was generated; and querying the reconstructed content segment with respect to the search query.

16. The method of claim 15, wherein generating a content segment skeleton comprises substituting, within the first content segment, the one or more parameters with one or more type qualifiers determined to correspond to the one or more parameters.

17. The method of claim 15, wherein generating a content segment skeleton comprises generating a content segment skeleton that reflects an arrangement of the one or more type qualifiers within the first content segment.

18. A non-transitory computer readable medium having instructions stored thereon that, when executed by a processing device, cause the processing device to perform operations comprising:

receiving unstructured content;

processing the unstructured content to identify a first content segment;

identifying, within the first content segment, one or more parameters;

classifying the one or more parameters;

within the first content segment, substituting the one or more parameters for one or more type qualifiers determined to correspond to the one or more parameters, thereby generating a content segment skeleton, the content segment skeleton comprising a hashed representation of an arrangement of the one or more type qualifiers within the first content segment;

based on the classifying, extracting the one or more parameters from the first content segment into a structured content element in a structured content format, wherein the structured content element includes the hashed representation of the content segment skeleton;

generating, based on the structured format, a query adapter;

receiving, via the query adapter, a free text search query comprising a first query element and a second query element;

querying a structured content repository with respect to the first query element to generate a first query result;

querying the structured content repository with respect to the second query element to generate a second query result;

combining the first query result and the second query result to identify a structured content element within the structured content repository that contains the first query element and the second query element;

processing one or more parameters of the identified structured content element with respect to a content segment skeleton included in the structured content element to reconstruct a content segment from the unstructured content based on which the identified structured content element was generated; and querying the reconstructed content segment with respect to the free text search query.

19. The non-transitory computer-readable medium of claim 18, wherein extracting the one or more parameters comprises indexing the one or more parameters from the first content segment into a database format.

\* \* \* \* \*